United States Patent [19]

Rabe

[11] Patent Number: 4,583,570
[45] Date of Patent: Apr. 22, 1986

[54] LIQUID COOLED BALL VALVE

[75] Inventor: George B. Rabe, Sparta, N.J.

[73] Assignee: Foster Wheeler Energy Corporation, Livingston, N.J.

[21] Appl. No.: 660,682

[22] Filed: Oct. 15, 1984

[51] Int. Cl.[4] .......................... F16K 49/00; F16L 7/00
[52] U.S. Cl. ..................................... 137/340; 137/375; 251/315
[58] Field of Search ................. 137/340, 375; 251/315, 251/304

[56] References Cited

U.S. PATENT DOCUMENTS

| 2,331,465 | 10/1943 | Fox | 137/340 |
| 3,213,876 | 10/1965 | Monton | 137/340 |
| 3,266,517 | 8/1966 | Carr | 137/340 |
| 3,901,269 | 8/1975 | Henderson | 137/340 |
| 4,195,655 | 4/1980 | Augsberger et al. | 137/340 |
| 4,292,992 | 10/1981 | Bhide | 137/340 |

FOREIGN PATENT DOCUMENTS

| 1226609 | 7/1960 | France | 137/340 |
| 1256454 | 2/1961 | France | 137/340 |

Primary Examiner—A. Michael Chambers
Attorney, Agent, or Firm—Marvin A. Naigur; John E. Wilson; Warren B. Kice

[57] ABSTRACT

Apparatus for controlling the flow of a hot material, such as gases emanating from a coal gasification plant, in which a ball is rotatable in a housing having a passage therethrough. Rotation of the valve aligns a passage in the valve with the passage in the housing to permit the passage of fluids through the assembly. Conversely, counterrotation of the ball closes the valve to the passage of fluids. Both the housing and ball are provided with channels for the passage of a cooling fluid therethrough, which prevents destruction of rubber seals, reduces erosion by abrasive materials in the gases, and reduces the thermal distortion which results in poor sealing characteristics.

7 Claims, 3 Drawing Figures

LIQUID COOLED BALL VALVE

BACKGROUND OF THE INVENTION

The present invention relates to a flow control assembly, and more particularly to such an assembly including a valve for controlling the flow of a hot material.

There are many applications in which it is necessary to control the flow of extremely hot materials. One example of such an application is in the control of gases emanating from a coal gasification plant. In such a plant the exhaust gases are usually at a temperature of about 2000 degrees F. and usually contain ash, which is very abrasive.

A type of valve assembly often used to control fluids in applications of this type is the conventional ball valve in which a spherical rotor, having a lateral channel therethrough, is rotated either to expose or close the channel to fluid flow. However, conventional valves often do not function properly under such extremely high temperatures. The excessive heat destroys conventional rubber O-ring seals and causes thermal distortion, resulting in poor sealing characteristics. In addition the heat appreciably degrades the strength of the seal comprising the valve, leading to erosion by abrasive materials such as ash.

OBJECTS AND SUMMARY OF THE INVENTION

It is therefore an object of the present invention to provide a flow control assembly for controlling the flow of a high temperature fluid, or the like.

It is another object of the present invention to provide a flow control assembly that provides improved sealing characteristics at high temperatures.

It is a further object of the present invention to provide a flow control assembly that permits the use of less expensive, conventional sealing mechanisms at high temperatures.

It is still a further object of the present invention to provide a flow control assembly that is not subject to erosion from abrasive materials at high temperatures.

These and other objects of the invention are accomplished by providing a ball, having a passage therethrough, positioned in a housing also having a passage therethrough. The ball is rotatable to permit the passages in the ball and the housing to be aligned in the "open" position and to be nonaligned in the "closed" position. The housing and the ball are provided with interconnected channels to permit the circulation of a cooling fluid through both the housing and the ball.

BRIEF DESCRIPTION OF THE DRAWINGS

The invention may be more fully understood by reading the appended detailed description of a preferred embodiment thereof in conjunction with the associated drawings wherein.

DETAILED DESCRIPTION OF A PREFERRED EMBODIMENT

Figure 1:
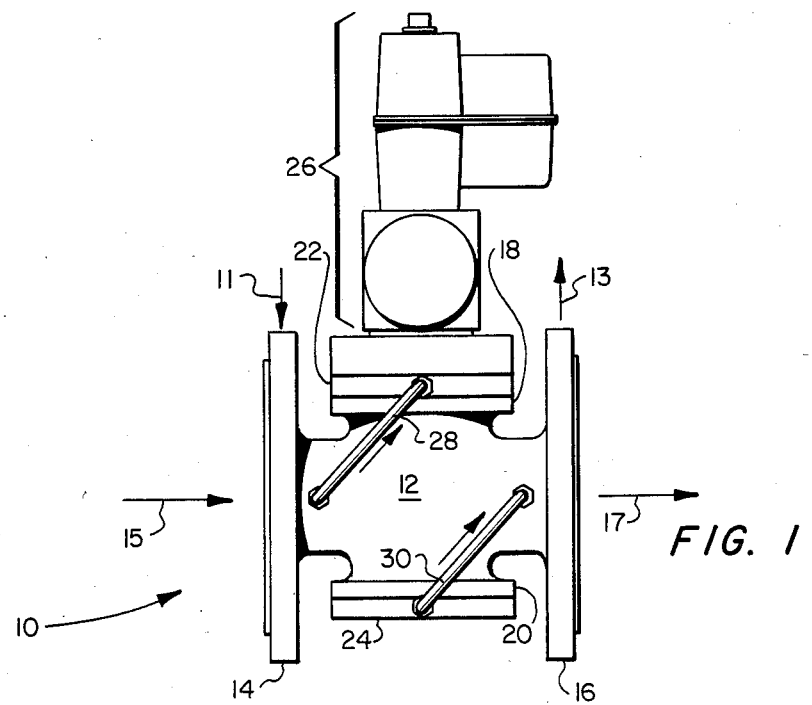
FIG. 1 is an elevation of a flow control assembly in accordance with the present invention.

Referring to FIG. 1, a flow control assembly 10 comprises a housing 12 having disk-shaped flanges 14 and 16 at the inlet and outlet thereof, respectively. Fluid flows through housing 12 in a channel (not shown in FIG. 1) that passes generally from the center of flange 14 to the center of flange 16, as illustrated by arrows 15 and 17. Flanges 14 and 16 are each connected by means of bolts, or the like, to similar flanges (not shown) on pipes or conduits carrying the fluid to be controlled by flow control assembly 10.

The flow control assembly 10 has on the upper and lower sides thereof flanges 18 and 20. Flange 18 has a bearing 22 attached thereto by means of bolts, or the like. Flange 20 has similarly attached thereto a bearing cap 24. Bearing 22 and bearing cap 24 generally support, in the interior of flow control assembly 10, a ball valve rotor not shown in FIG. 1 and to be hereinafter described. The ball valve rotor is rotated by means of a pneumatically-operated rotary activator assembly 26, or the like. Activator assembly 26 is preferably spring loaded to provide spring return to the "closed" position when activator assembly 26 is not energized.

A coolant liquid is circulated through flow control assembly 10 via tubes 28 and 30. Tube 28 connects between chassis 12 and bearing 22, and tube 30 connects between bearing cap 24 and chassis 12.

Figure 2:
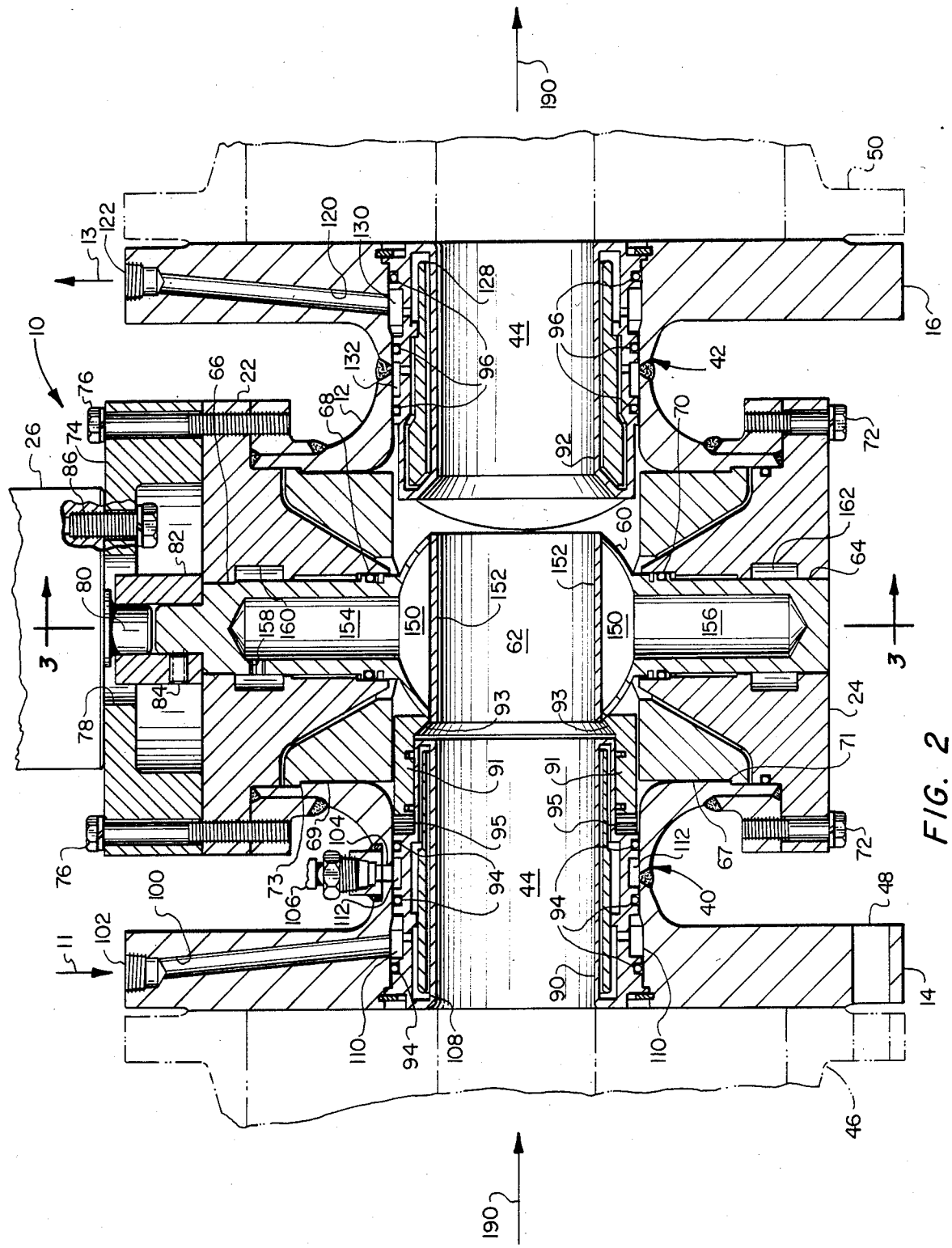
FIG. 2 is a cross-sectional view of the flow control assembly of FIG. 1 taken parallel to fluid flow therethrough.

Referring now to FIG. 2, flow control assembly 10 has an inlet conduit section 40 and an outlet conduit section 42 each having a channel 44 through the center thereof. Inlet conduit section 40 has connected to the end thereof flange 14, which is connected to a conduit 46 by bolts, or the like (not shown), passing through a bore 48. Similarly, outlet conduit section 42 is connected to flange 16, which is also connected by bolts, or the like (not shown), to a conduit 50. Conduits 46 and 50 are used to carry fluid whose flow is to be controlled by flow control assembly 10.

Chassis 12 has in the center thereof and between inlet conduit section 40 and outlet conduit section 42 a void containing a ball valve 60 having a channel 62 passing through the center thereof. Ball valve 60 is positioned such that channel 62 is aligned with channels 44 when the valve is in the "open" position. Ball valve 60 is held in position by means of a lower shaft 64 and an upper shaft 66, each of which are axially aligned on opposite sides of ball 60.

Lower shaft 64 and upper shaft 66 are supported by bearing cap 24 and bearing 22, respectively, each having a central bore therein sized to receive and to permit rotation of shafts 64 and 66. Bearing cap 24 and bearing 22 also serve to secure in housing 12 annular refractory liners 67 and 69, respectively. Liners 67 and 69 have a frustroconical void therein to receive the complementary-shaped sections of bearing cap 24 and bearing 22. Liners 67 and 69 are held in position by means of flanges 71 and 73 on the edge of each, respectively. Leakage of fluid between shafts 64 and 66 and bearing cap 24 and bearing 22, respectively, is prevented by means of O-rings 68 and 70 positioned about shafts 64 and 66, respectively. Bearing cap 24 is secured to chassis 12 by means of bolts 72, or the like. Bearing 22 has connected on the top thereof an activator connector housing 74 by means of bolts 76, or the like.

Connector housing 74 is generally U-shaped in cross section and has a bore 78 through the center thereof to permit the passage of a shaft 80 protruding from the lower end of pneumatic activator 26. Activator shaft 80 is connected to ball valve shaft 66 by means of a collar 82, with the shaft 80 is being keyed to permit entry into a slot in the upper end of collar 82. Ball valve shaft 66 is preferably circular in cross section inside collar 82 and is secured by a set screw 84 extending through the collar. This arrangement permits relative adjustment between shafts 68 and 82. Pneumatic activator assembly 26 may be connected to connector housing 74 by means of bolts 86, or the like.

The channels through inlet conduit section 40 and outlet conduit section 42 are lined with an inlet sleeve 90 and an outlet sleeve 92, respectively. Inlet sleeve 90 is sealed to inlet portion 40 by means of O-rings 94; similarly, outlet sleeve 92 is sealed to outlet portion 42 by means of O-rings 96. O-rings 94 and 96 are positioned between a series of channels on the outer periphery of inlet portion 40 and outlet portion 42, respectively, as will be described hereinafter. Positioned between inlet sleeve 90 and ball valve 60 is an annular valve seat 91 having an inwardly protruding lip 93 for contacting the spherical surface of ball 60. Valve seat 91 is kept in contact with ball 60 by means of a multiplicity of wave washers 95 positioned between seat 91 and inlet sleeve 90.

Cooling fluid is passed through the flow control assembly 10 by means of a series of channels in the various parts thereof. Flange 14 has cut therein a radially-oriented channel 100 passing from a threaded fitting 102 on the periphery of flange 14 to channel 44 in inlet portion 40 and communicates with a plurality of channels in inlet sleeve 90 to be hereinafter described. Inlet conduit section 40 has cut therein a bore 104 having a threaded fitting 106 therein. Bore 104 passes completely through the wall of inlet conduit section 40 and communicates with channels in inlet sleeve 90 as hereinafter described.

Inlet sleeve 90 has formed in the walls thereof an interior channel 108 extending completely therearound. Entry to channel 108 is provided by means of a peripheral groove 110 which mates with the interior wall of the bore in inlet conduit section 40 to create an enclosed annular void opening into channel 100. Exit from channel 108 is provided by a similar peripheral groove 112 which mates with the interior wall of the bore inlet conduit section 40 to create an enclosed annular void opening into bore 104. O-rings 94 are positioned inside channel 112, outside channel 110, and between channels 110 and 112 to prevent fluid leakage therefrom and therebetween.

Similarly, flange 16 has cut therein a radially-oriented channel 120 passing from a threaded fitting 122 on the periphery of flange 16 to channel 44 in outlet conduit section 42 and communicates with a plurality of channels in outlet sleeve 92. Outlet conduit section 42 has cut therein another bore similar to bore 104 communicating to the exterior of outlet conduit section 42 (bore not shown). Channel 120 and the outlet bore described immediately above communicates with channels in outlet sleeve 92 hereinafter described.

Outlet sleeve 92 has formed in the walls thereof an interior channel 128 extending completely therearound. Entry to channel 128 is provided by means of a peripheral groove 130 which mates with the interior wall of the bore in outlet conduit section 42 to create an enclosed annular void opening into channel 120. Exit from channel 128 is provided by a similar peripheral groove 132 which mates with the interior wall of the bore in outlet portion 42 to create an enclosed annular void opening into the previously described outlet bore and associated fitting (not shown). O-rings 96 are positioned inside channel 132, outside channel 130 and between channels 130 and 132 to prevent fluid leakage therefrom and therebetween.

Ball valve 60 and associated shafts 64 and 66 are also provided with integral channels for the passage of coolant fluid therethrough. Ball valve 60 has an annular void 150 defined internally by wall 152 that separates void 150 from channel 62. Void 150 communicates with a bore 154 in shaft 66 and a bore 156 in shaft 64. Bore 154 communicates, via a side bore 158, to an annular groove 160 in bearing body 22. Groove 160 is sealed to form a channel for the flow of cooling fluids by means of shaft 66. Groove 160 communicates with the exterior of the valve assembly by means to be described in connection with FIG. 3.

A bore (not shown in FIG. 2) similar to 158 permits fluid communication between bore 156 and annular groove 162. Groove 162 communicates to the exterior of the valve assembly by means also to be described in connection with FIG. 3.

Figure 3:
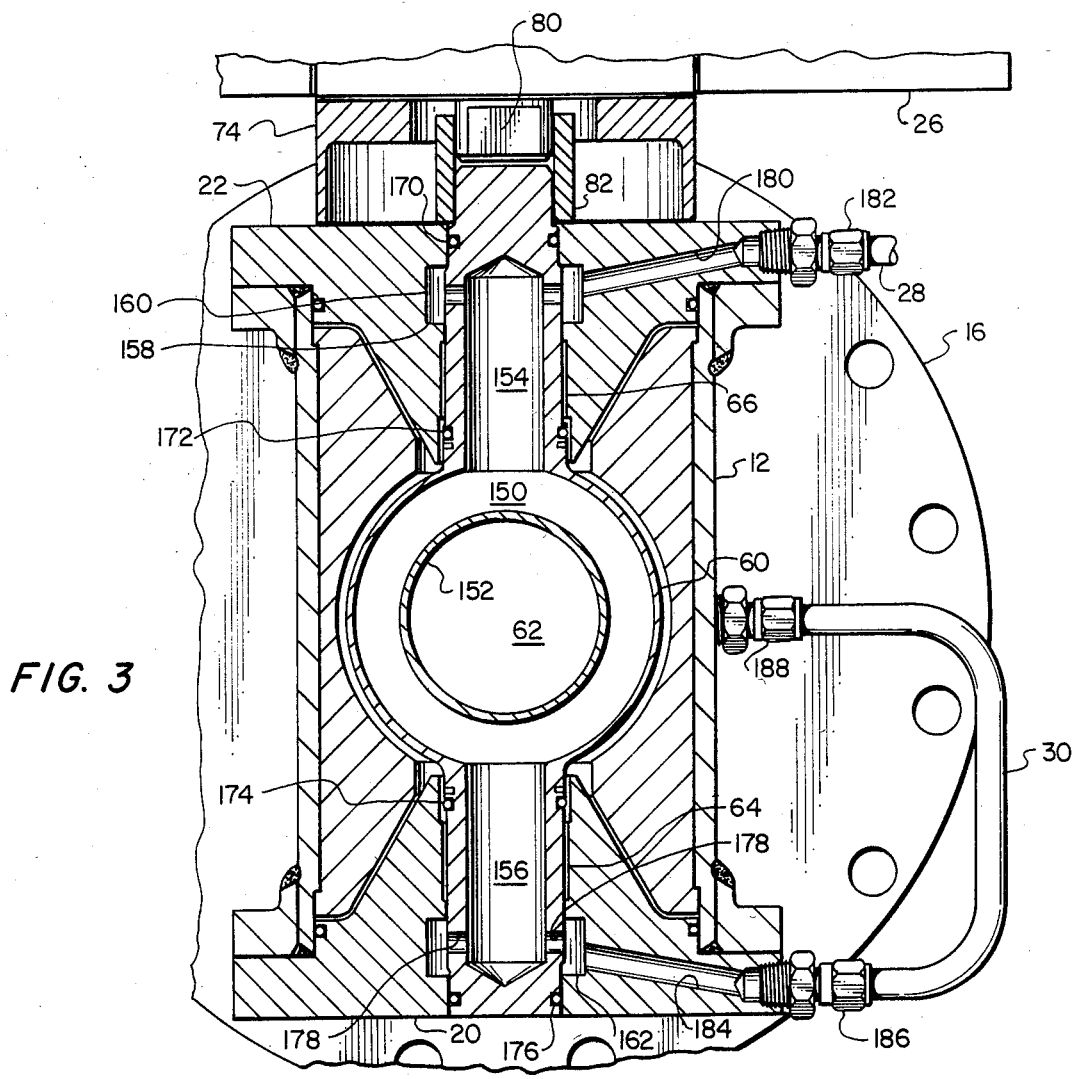
FIG. 3 is a cross-sectional view of the flow control assembly of FIG. 1 taken perpendicular to fluid flow therethrough.

Referring now to FIG. 3, ball 60 is shown positioned inside chassis 12. A slight clearance is provided between ball 60 and the interior of chassis 12 to permit rotation of the ball 60 therein. Leakage of fluids along shafts 64 and 66 is prevented by means of O-ring seals 170, 172, 174, and 176. Groove 160 communicates with the exterior of chassis 12 via a channel 180 having a fitting 182 at the mouth thereof, which fitting 182 is connected to a tube 28. Bore 156, in lower shaft 64, communicates with annular groove 162 via bores 178. Groove 162 communicates with the exterior of chassis 12 via a channel 184 having a fitting 186 at the mouth thereof, which is connected to a tube 30. Tube 30 is attached to a fitting 188 which permits communication with channel 132 (FIG. 2).

In operation, ball 60 in its closed state is oriented such that channel 62 is turned 90 degrees from channel 44, thereby preventing the passage of fluids therethrough as shown in FIG. 2. In order to open the valve, ball 60 is turned by means of pneumatically-operated activator assembly 26 to align channel 62 with channels 44, thereby permitting the passage of fluids through the valve assembly as illustrated by arrows 190.

Cooling of the valve assembly is provided by passing a coolant fluid through the channels and void hereinbefore described to absorb and remove excess heat. The coolant begins its transit through the valve assembly through the channel 100 in inlet flange 14 as indicated by arrow 11. The coolant passes through channel 100 in flange 14, through groove 110 and into channel 108 in inlet sleeve 90. After passing through channel 108, the coolant enters groove 112 and bore 104, from which it passes through fitting 106 into tube 28 as shown by the arrow superimposed on tube 28 (FIG. 1).

Referring to FIG. 3, the coolant passes from tube 28 into channel 180, from whence in passes through groove 160 and bore 158 into bore 154 in upper shaft 66. The fluid then passes through void 150 in ball 60, around channel 62, and finally into bore 156 in lower shaft 64. It then completes passage through the ball assembly by passing through bores 178, groove 162, and channel 184 into tube 30 through fitting 186. The direction of the coolant flow is indicated by means of the arrow superimposed upon tube 30 in FIG. 1.

Referring to FIG. 3, the final stage of the cooling cycle begins with the passage of the coolant from tube 30 into groove 132, from whence it enters channel 128 in outlet sleeve 92. The coolant exits channel 128 via groove 130 and channel 120, as indicated by arrow 13.

The cooling features of the ball valve assembly thusfar described provide a number of advantages. First, the lower temperatures permit the use of conventional rubber O-rings seals to accomplish the seat to valve body seal. Second lower thermal distortion of the sealing surfaces will permit good sealing characteristics. Third, cooler temperatures will prevent degradation of the metal comprising valve body, which reduces susceptibility to abrasion when transmitting materials such as gasified coal and associated ash.

While particular embodiments of the invention have been shown and described, it is obvious that changes and alterations may be made therein without departing from the true scope and spirit of the invention. It is the intent in the attached claims to cover all such changes and modifications.

What is claimed is:

1. A flow control assembly comprising:
    a housing having a passage therethrough;
    a rotatable ball valve in the passage in the housing, said ball valve having a passage therethrough for alignment with said passage in said housing in one position of said ball valve to permit fluid flow through said passage;
    an annular channel is said ball valve extending around said passage in said ball valve;
    an inlet sleeve positioned in one end of said passage in said housing and having a channel formed therein for receiving cooling fluid;
    an outlet sleeve positioned in the other end of said passage in said housing and having a channel formed therein for receiving cooling fluid; and
    means in said housing for connecting said channel in said inlet sleeve with said annular channel in said ball valve, and for connecting said annular channel in said ball valve with said channel in said outlet sleeve, to permit circulation of said cooling fluid through said housing and said ball valve.

2. Apparatus in accordance with claim 1 wherein said connecting means comprises:
    a first shaft on said ball valve;
    a second shaft on said ball valve opposite the first shaft;
    said first and second shafts being disposed in said housing to permit rotation of said ball valve in said housing;
    said first and second shafts having a central chamber therein in communication with said annular channel in said ball valve and with said channels in said inlet sleeve and outlet sleeve, respectively.

3. Apparatus in accordance with claim 2 wherein said first and second shafts are positioned in mating bores in said housing and wherein said connecting means further comprises annular grooves formed in said housing and surrounding each of said mating bores.

4. Apparatus in accordance with claim 3 wherein said shafts have openings communicating said annular grooves and said chambers in said shafts.

5. Apparatus in accordance with claim 4 wherein said connecting means further comprises a multiplicity of annular groove in said housing surrounding said inlet and outlet sleeve.

6. Apparatus in accordance with claim 2 further comprises an inlet and outlet passage disposed in said housing for receiving and discharging cooling fluid, respectively, said inlet and outlet passages communicating with said channels in said inlet and outlet sleeves, respectively.

7. Apparatus in accordance with claim 6 wherein said housing further includes inlet and outlet flanges on each end of aid passage through said housing, said inlet and outlet passages extending through said inlet and outlet flanges, respectively.

* * * * *